United States Patent Office 2,852,488
Patented Sept. 16, 1958

2,852,488

STABILIZED POLYOLEFINIC COMPOSITIONS AND METHOD FOR PREPARING SAME

Gerald A. Clark, Midland, and Carl B. Havens, Hope, Mich., assignors to The Dow Chemical Company, Midland, Mich., a corporation of Delaware No Drawing. Application September 27, 1955
Serial No. 537,043

12 Claims. (Cl. 260—45.9)

This invention relates to novel stabilized compositions comprised of polymerized olefinic and like ethylenically unsaturated materials, particularly polyethylene, which are resistant to becoming brittle and dark upon exposure to heat and light and to a method for preparing such compositions.

Many compositions comprised essentially of polymerized olefinic and other ethylenically unsaturated materials tend to become embrittled and darker in color on exposure of the composition to heat or light, or both. This is especially the case with polyethylene compositions. It is particularly so in connection with exposures to ultraviolet light. Such behavior is undesirable in articles manufactured from compositions of this nature.

While there are additive substances which are known and employed for the purpose of retarding embrittlement induced by exposure to heat and light in polyethylene and like compositions, such substances frequently impart an undesirably dark coloration to the polymer. This tends to restrict the adaptability of the stabilized compositions for being employed in lighter colored products. In addition, many of the stabilizing additive substances may not be completely or satisfactorily effective to prevent dark coloration of the polymer product from developing upon or after exposure to ultraviolet light. This further limits the adaptability of conventionally stabilized compositions for being employed in the manufacture of lighter colored products.

It would be advantageous for polyethylene and like compositions which are employed in lighter colored formulations to be stabilized against embrittlement and darkening upon exposure to heat and light, particularly ultraviolet light. It would be especially advantageous if the stabilizing additive substances employed for this purpose did not, upon admixture, induce darker coloration in the polymer product.

These desiderata may be realized in accordance with the present invention which advantageously provides for compositions comprised essentially of polymerized olefinic materials, particularly polyethylene, and containing stabilizing quantities of conventional, non-darkening antioxidant substances for polyolefinic and like materials in combination with an ultraviolet light absorbing additive substance which advantageously is selected from the group consisting of polybenzoyl resorcinol compounds and chlorinated polybenzoyl resorcinol compounds. Compositions according to the present invention may be prepared by incorporating a stabilizing quantity, which advantageously may be between about 0.01 and 2.00 percent by weight, of the non-darkening antioxidant substance in combination with a stabilizing quantity, which also may advantageously be between about 0.1 and 2.00 percent by weight of the ultraviolet light absorbing additive substance.

The compositions of the present invention are exceptionally resistant to embrittlement and discoloration upon exposure to heat and light, particularly ultraviolet light. As a consequence they may be prepared without hesitancy as lighter and white colored formulations for the manufacture of various shaped and molded articles and structures. In addition, such compositions may be manufactured into lighter and white colored products without concern over the development of subsequent embrittlement in the product upon exposures of the nature described.

The antioxidants which may be employed in the present invention are conventional, non-darkening antioxidants for rubber. These include hydroquinone ethers, various substituted hydroquinones, hydrocarbon substituted aryl amines and various aniline derivatives, wax formulated tolylamines, various substituted naphthylamines, polymerized hydroquinolines, substituted phenylenediamines, various substituted phenol and phenol derivative compounds and the like which are well known in the art. Specifically, while it is not intended to be restricted thereto, such antioxidant materials as those comprising condensation products of acetone and aniline melting at about 120° C., typified by polymers of 1,2-dihydro-2,2,4-trimethyl quinoline, such as those which are manufactured under the trade name "Flectol H" by the Monsanto Chemical Company; those comprising such materials as aryl oxy-ketones, typified by the compound 4,4'-cyclohexylidene diphenol such as those which are manufactured under the trade name "Flectol White" by the Monsanto Chemical Company; those comprising such materials as aryl oxyketones, typified by the compound 4,4'-cyclohexylidene diphenol, such as those which are manufactured under the trade name "Flectol White" by the Monsanto Chemical Company; those comprising reaction products of acetone and para-aminobiphenyl, typified by polymers of 1,2-dihydro-2,2,4-trimethyl-6-phenyl quinoline, such as those which are manufactured under the trade name "Santiflex B" by the Monsanto Chemical Company; those comprising tri-substituted phenols melting at about 70° C., typified by the trialkyl-substituted phenol; 2,6-diterti-arybutyl-4-methyl phenol, such as those which are manufactured under the trade name "Ionol" by the Shell Chemical Corporation and those comprising sym. di-beta-naphthyl-para-phenylenediamine, which may also be identified as N,N'-di-β-naphthyl-p-phenylenediamine, such as those which are manufactured under the trade name "Agerite White" by the R. T. Vanderbilt Company may advantageously be employed for purposes of the present invention.

The polybenzoyl resorcinol and chlorinated polybenzoyl resorcinol compounds which may be employed in the present invention include dibenzoyl resorcinol, particularly mixtures containing about 75 to 90 percent by weight of the 2,4-isomer with the 4,6-isomer; 4,6-dibenzoyl resorcinol; 2,4,6-tribenzoyl resorcinol; 2,4-di-(2-chlorobenzoyl) resorcinol; 2,4-di(4-chlorobenzoyl) resorcinol; 2,4-di(2,4-dichlorobenzoyl) resorcinol; and dibenzoyl (4-chloro resorcinol).

These compounds are readily available by various methods of preparation. By way of illustration with dibenzoyl resorcinol, an orthodichlorobenzene solution of resorcinol and benzoyl chloride containing a slight excess of aluminum chloride may be maintained at a temperature of about 135° C. for about a half-hour before adding dilute hydrochloric acid to the reaction mixture. The product may be purified by distillation or by recrystallization from methanol or by both processes. Dibenzoyl resorcinol prepared in this manner generally contains about 75 to 90 percent by weight of the 2,4-isomer in a mixture with the 4,6-isomer. The isomer mixtures, as indicated, are effective ultraviolet light absorbing additive substances. They may advantageously be utilized for purposes of the present invention.

Practice of the invention is especially beneficial for polyethylene materials of any origin. For example, it may be employed with polyethylenes produced by conventional high pressure techniques having a melting point of about 110° C. and a density of about 0.92 gram per cubic centimeter. It is equally beneficial for polyethylenes prepared under relatively low pressures with admixed metallic catalysts and having a melting point around 130° C. and a density between about 0.94 and 0.97 gram per cubic centimeter.

As mentioned, the antioxidant materials and the polybenzoyl resorcinol and polychlorobenzoyl compounds may be employed in combination in desired amounts not in excess of about 2.00 percent by weight of each based on the weight of the polyolefinic and the like material. Advantageously amounts between about 0.25 and 0.75 percent by weight of each are employed. The polymeric compositions of the present invention may also, if desired, be formulated containing such ingredients as plasticizers, fillers, pigments and other stabilizing and additive materials without harmful or adverse consequence. The compositions may be prepared by intermixing, milling or blending the ingredients according to commonly employed methods.

Further features and advantages of the present invention are illustrated by the following examples wherein, unless otherwise indicated, all parts and percentages are by weight.

Example I

Equal parts of tribenzoyl resorcinol and an antioxidant comprising a condensation product of acetone and aniline manufactured by Monsanto Chemical Company under the trade name "Flectol H" were dissolved in acetone and mixed in a finely ground, light colored polyethylene composition containing about 200 parts of polyethylene having a molecular weight of about 50,000 which was prepared by polymerization of ethylene at atmospheric pressure with a metal alkyl catalyst. After thorough mixing, the composition was oven dried at about 70°–80° C. to remove the acetone.

The composition was melt extruded to form about a 10 mil. diameter monofilament which, immediately after extrusion was subjected to a boiling water bath in which it was stretched to a length of about 8½ times its original length. The hot stretched filament was then shrunk to a completely relaxed state in boiling water.

The stabilized structure was then given an aging test for about 7 days during which it was subjected to a concentrated exposure of ultraviolet light from an artificial sunlamp source. The filament was maintained at a temperature of about 45° C. throughout the test. At the conclusion of the 7 day period the light colored filament remained light in color without signs of darkening and had tough and flexible physical characteristics.

Example II

Similar polyethylene filament samples to those of Example I were prepared containing various proportions of tribenzoyl resorcinol and "Flectol H." In one, about 0.25 percent of tribenzoyl resorcinol and about 0.75 percent of "Flectol H" were incorporated. In another the respective percentages of tribenzoyl resorcinol and "Flectol H" were 0.25 and 0.50. In others it was 0.25 and 0.25; 0.50 and 0.25; 0.50 and 0.75; 0.75 and 0.25; 0.75 and 0.50; and 0.75 and 0.75. All of the samples, when subjected to the same aging test described in Example I, showed excellent resistance to embrittlement and discoloration.

When samples of polyethylene prepared under extremely high pressure with oxygen catalysts were stabilized in the same way they also displayed very high resistance to embrittlement and discoloration.

By way of contrast, when samples of polyethylene monofilament were prepared containing only the antioxidant additive or only the tribenzoyl resorcinol, they did not withstand exposure to ultraviolet light nearly as well.

Example III

The procedures of Examples I and II were repeated using additive combinations which included dibenzoyl resorcinol and a tri-substituted phenol antioxidant ("Ionol"); tribenzoyl resorcinol and a tri-substituted phenol antioxidant ("Ionol"); dibenzoyl resorcinol and an aryl oxy-ketone ("Flectol White"); tribenzoyl resorcinol and an aryl oxy-ketone ("Flectol White"); dibenzoyl resorcinol and a condensed acetone-aniline antioxidant ("Flectol H"); and dibenzoyl resorcinol and sym. di-beta-naphthyl-para-phenylenediamine ("Agerite White"). In all cases the stabilized compositions, which were prepared in the form of light colored monofilaments, displayed high resistance to discoloration and embrittlement when subjected to the same ultraviolet aging test described in Example I.

When 2,4-di(2 - chlorobenzoyl)resorcinol, 2,4 - di(4-chlorobenzoyl)resorcinol, 2,4-dibenzoyl resorcinol and dibenzoyl (4-chlororesorcinol) are employed in additive combinations with "Ionol," "Flectol White" and "Agerite White" for stabilizing polyethylene, similar excellent results are obtained.

Since certain changes and modifications in the practice of the present invention can readily be entered into without substantially departing from its spirit and scope it is to be understood that all of the foregoing description be interpreted as being merely illustrative.

What is claimed is:

1. A composition of matter which is particularly stable to ultraviolet light comprising polyethylene and from about 0.01 to about 2.00 percent of the weight of the polyethylene of a non-darkening rubber antioxidant additive substance selected from the group consisting of condensation products of acetone and aniline melting at about 120° C., 4,4' cyclohexylidene diphenol, reaction products of acetone and para-aminobiphenyl, trialkyl-substituted phenol compounds in which the alkyl substituents contain not more than about 4 carbon atoms, said compounds melting at about 70° C., and sym. di-beta-naphthyl-para-phenylenediamine, said antioxidant being in combination with from about 0.1 to about 2.00 percent of the weight of the polyethylene of an ultraviolet light absorbing additive substance selected from the group consisting of 2,4-dibenzoyl resorcinol; 4,6-dibenzoyl resorcinol; mixtures of the 2,4-isomer and the 4,6-isomer of dibenzoyl resorcinol; 2,4,6-tribenzoyl resorcinol; 2,4-di(2-chlorobenzoyl) resorcinol; 2,4 - di(4 - chlorobenzoyl) resorcinol; 2,4-di(2,4-dichlorobenzoyl) resorcinol; and dibenzoyl (4-chloro resorcinol).

2. A composition in accordance with claim 1 wherein the antioxidant additive substance is present in an amount between about 0.25 and 0.75 percent by weight and the ultraviolet light absorbing additive substance is present in an amount between about 0.25 and 0.75 percent by weight.

3. A composition in accordance with claim 1 wherein the ultraviolet light absorbing additive substance is a mixture of 2,4-dibenzoyl resorcinol and 4,6-dibenzoyl resorcinol.

4. A composition in accordance with claim 1 wherein the ultraviolet light absorbing additive substance is 2,4-di(2-chlorobenzoyl) resorcinol.

5. A composition in accordance with claim 1 wherein the ultraviolet light absorbing additive substance is 2,4-di(4-chlorobenzoyl) resorcinol.

6. A composition in accordance with claim 1 wherein the ultraviolet light absorbing additive substance is 2,4-dibenzoyl resorcinol.

7. A method for preparing compositions which are particularly stable to ultraviolet light containing polyethylene which comprises intimately dispersing in the polyethylene from about 0.01 to about 2.00 percent of the weight of the polyethylene of a non-darkening rubber antioxidant additive substance selected from the group consisting of condensation products of acetone and aniline melting at about 120° C., 4,4' cyclohexylidene diphenol, reaction products of acetone and para-aminobiphenyl, trialkyl-substituted phenol compounds in which the alkyl substituents contain not more than about 4 carbon atoms, said compounds melting at about 70° C., and sym. di-beta-naphthyl-para-phenylenediamine, and from about 0.1 to about 2.00 percent of the weight of the polyethylene of an ultraviolet light absorbing additive substance selected from the group consisting of 2,4-dibenzoyl resorcinol; 4,6-dibenzoyl resorcinol; mixtures of the 2,4-isomer and the 4,6-isomer of dibenzoyl resorcinol; 2,4,6-tribenzoyl resorcinol; 2,4 - di(2 - chlorobenzoyl) resorcinol; 2,4-di(4-chlorobenzoyl) resorcinol; 2,4-di(2,4-dichloro benzoyl) resorcinol; and dibenzoyl (4-chloro resorcinol).

8. A method in accordance with the method of claim 7 wherein the antioxidant additive substance is intimately dispersed in an amount between about 0.25 and 0.75 percent by weight of the weight of the polymerized material and wherein the ultraviolet light absorbing additive substance is intimately dispersed in an amount between about 0.25 and 0.75 percent by weight of the polymerized material.

9. A method in accordance with the method of claim 7 wherein the ultraviolet light absorbing additive substance is a mixture of 2,4-dibenzoyl resorcinol and 4,6-dibenzoyl resorcinol.

10. A method in accordance with the method of claim 7 wherein the ultraviolet light absorbing additive substance is 2,4-di(2-chlorobenzoyl) resorcinol.

11. A method in accordance with the method of claim 7 wherein the ultraviolet light absorbing additive substance is 2,4-di(4-chlorobenzoyl) resorcinol.

12. A method in accordance with the method of claim 7 wherein the ultraviolet light absorbing additive substance is 2,4 dibenzoyl resorcinol.

References Cited in the file of this patent

UNITED STATES PATENTS 2,568,894     Mackey _____ Sept. 25, 1951

FOREIGN PATENTS 714,772     Great Britain _____ Sept. 1, 1954